United States Patent
Ooi

(10) Patent No.: US 10,930,025 B1
(45) Date of Patent: Feb. 23, 2021

(54) INTELLIGENT COLOR LABEL MATCHING

(71) Applicant: SAP SE, Walldorf (DE)

(72) Inventor: Hee Tatt Ooi, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/572,426

(22) Filed: Sep. 16, 2019

(51) Int. Cl.
| | |
|---|---|
| *G09G 5/06* | (2006.01) |
| *G06T 11/00* | (2006.01) |
| *G06T 15/00* | (2011.01) |
| *G06T 19/20* | (2011.01) |
| *G06T 11/20* | (2006.01) |

(52) U.S. Cl.
CPC .......... *G06T 11/001* (2013.01); *G06T 11/206* (2013.01); *G06T 15/005* (2013.01); *G06T 19/20* (2013.01); *G09G 5/06* (2013.01)

(58) Field of Classification Search
None
See application file for complete search history.

(56) References Cited

U.S. PATENT DOCUMENTS

| | | | | |
|---|---|---|---|---|
| 6,995,865 B1 * | 2/2006 | Motomura | ........... | H04N 1/6058 358/1.9 |
| 2010/0172576 A1 * | 7/2010 | Goldfarb | ................ | G06T 7/11 382/164 |
| 2015/0379004 A1 * | 12/2015 | Sayre, III | ................ | G06F 16/54 707/772 |
| 2016/0232686 A1 * | 8/2016 | Park | ..................... | G06F 3/0481 |
| 2018/0268578 A1 | 9/2018 | Wittkopf et al. | | |

OTHER PUBLICATIONS

Heer et al, 'Color Naming Models for Color Selection, Image Editing and Palette Design', ACM, CHI 2012. (Year: 2012).*
Blutner.de[Online], "Colour Words and Colour Categorization" available on or before Feb. 18, 2005, via Internet Archive: Wayback Machine URL <http://web.archive.org/web/20050218172147/http://www.blutner.de/color/Color_Words.pdf>, retrieved on Mar. 31, 2020, URL <http://www.blutner.de/color/Color_Words.pdf>, 27 pages.
Joshua Rael, "Colormoo: An Algorithmic Approach to Generating Color Palettes.", 2014, 46 pages.

(Continued)

*Primary Examiner* — Patrick F Valdez
(74) *Attorney, Agent, or Firm* — Fish & Richardson P.C.

(57) ABSTRACT

The present disclosure involves, systems, software, and computer-implemented methods for determining a color name or label from a color code. One example method comprises receiving information about a color and identifying the luminance of the color. If the luminance of the color is below a first luminance threshold, the color is labeled as black, and if the luminance of the color is above a second luminance threshold, the color is labeled as white. If the color is determined to be neither black nor white (e.g., if the luminance is between the first luminance threshold and the second luminance threshold), then the saturation of the color is identified, and if the saturation of the color is below a saturation threshold, the color is labeled gray. If the color is determined not to be gray (e.g., if the saturation is above the saturation threshold), the hue of the color is identified, and the color is labeled according to its hue.

19 Claims, 5 Drawing Sheets
(2 of 5 Drawing Sheet(s) Filed in Color)

(56) References Cited

OTHER PUBLICATIONS

Spin.Atomicobject.com[Online], "Pixels and Palettes: Extracting Color Palettes From Images", Dec. 7, 2016, [retreived on Mar. 31, 2020], retrieved from: URL <https://spin.atomicobject.com/2016/12/07/pixels-and-palettes-extracting-color-palettes-from-images/>, 11 pages.

Wikipedia Contributors, "Color Cell Compression", created on Nov. 9, 2011, [retrieved on Mar. 31, 2020], retrieved from: URL <https://en.wikipedia.org/wiki/Color_Cell_Compression>, 4 pages.

Erinswowards.com [Online], "Color Values and CSS" Jan. 24, 2011, [Retrieved on Sep. 19, 2019], retrieved from: URL <http://www.erinsowards.com/articles/2011/01/colors.php>, 10 pages.

\* cited by examiner

| Color Name | Luminance Range |
|---|---|
| Black | [0%, 12%) |
| White | (93%, 100%] |

*FIG. 3*

| Color Name | Saturation Range |
|---|---|
| Gray | [0%, 25%) |

*FIG. 4*

| Color Label | Hue Range |
|---|---|
| Red | [0, 15), [345, 360] |
| Orange | [15, 45) |
| Yellow | [45, 75) |
| Yellow-Green | [75, 105) |
| Green | [105, 135) |
| Green-Cyan | [135, 165) |
| Cyan | [165, 195) |
| Cyan-Blue | [195, 225) |
| Blue | [225, 255) |
| Blue-Magenta | [255, 285) |
| Magenta | [285, 315) |
| Magenta-Red | [315, 345) |

*FIG. 5*

INTELLIGENT COLOR LABEL MATCHING

BACKGROUND

Colors that are displayed in web pages on the Internet or in other electronic documents are often referenced using color codes, which provide a shorthand for the various values of the color. Colors may be referenced using various types of color codes, including an RGB format or a hexadecimal format. For example, solid red may be expressed as (255, 0, 0) as an RGB triplet or as #FF0000 in a hexadecimal format. These color codes are not necessarily meaningful to humans reading the codes, however. Rather, in many instances, human readable color labels such as "red," "black," or "green" may be more useful.

SUMMARY

The present disclosure involves systems, software, and computer-implemented methods for determining a color name or label from a color code. An example method comprises receiving information about a color, identifying luminance of the color, in response to determining that the luminance of the color is below a first luminance threshold, labeling the color as black, in response to determining that the luminance of the color is above a second luminance threshold, labeling the color as white, in response to determining that the luminance is between the first luminance threshold and the second luminance threshold, identifying saturation of the color, in response to determining that the saturation of the color is below a saturation threshold, labeling the color as gray, in response to determining that the saturation is above the saturation threshold, identifying hue of the color; and in response to identifying the hue of the color, labeling the color according to the hue.

In some implementations, labeling the color according to the identified hue comprises using a color table comprising a plurality of color labels and a plurality of hue thresholds for each color label in the plurality of color labels.

In some implementations, each of the first luminance threshold, second luminance threshold, saturation threshold, and the plurality of hue thresholds is user adjustable. In some implementations, labeling the color according to the identified hue comprising labeling the color as blue if the identified hue is between 180 and 255. In some implementations, labeling the color according to the identified hue comprising labeling the color as yellow if the identified hue is between 45 and 75.

In some implementations, the method further includes receiving feedback from a user with respect to the labeled color. In some implementations, the method further includes determining that the received feedback includes an indication that the user disagrees with the labeled color; and adjusting the value of one or more of the first luminance threshold, second luminance threshold, saturation threshold, and the plurality of hue thresholds based on the received feedback.

In some implementations, the received feedback from the user includes an indication of a user-determined color label; and method includes the additional step of adjusting the value of one or more of the first luminance threshold, second luminance threshold, saturation threshold, and plurality of hue thresholds based on the received feedback.

In some implementations, the first luminance threshold, second luminance threshold, saturation threshold, and the plurality of hue thresholds are calculated using one or more machine learning algorithms.

In some implementations, the method further comprises providing a plurality of color samples to a plurality of users; receiving, from each of the plurality of users, inputs for each of the color samples, wherein the inputs comprise color names that match the color samples; using a machine learning algorithm to calculate the first luminance threshold, second luminance threshold, saturation threshold, and the plurality of hue thresholds based on the received inputs.

In some implementations, the plurality of color labels are derived from the received inputs. In some implementations, the method further comprises converting the information about the color into a hue, saturation, and luminance format. In some implementations, the information about the color comprises a color code. The technical solutions described herein provide a number of benefits to technology relating to color recognition. In particular, software solutions generally provide descriptions of colors in the form of color codes, such as hexadecimal (e.g., #FF0000), RGB (e.g., (255, 0, 0)), and CMYK (e.g., (0, 100%, 100%, 0)). These color codes are suitable for precisely describing a color, but the color codes are not generally human-readable or intuitive to most people.

In many cases, it is easier for a user to work with a human-readable color name (e.g., red, white, black). Intuitively readable color names that humans see and frequently use to describe a color are often more useful and relatable when relaying information to humans. However, these color names usually encompass a range of color codes and not exactly one color code.

For example, various shades of blue exist, such as sky blue, royal blue, and navy blue. These colors may correspond to hexadecimal color codes #87ceeb, #4169e1, and #000080, respectively. Similarly, these colors may respond to RGB color codes (52.9, 80.8, 92.2), (25.5, 41.2, 88.2), and (0, 0, 50.2), respectively, or CMYK color codes (42.6%, 12.3%, 0%, 7.8%), (71.1%, 53.3%, 0%, 11.8%), and (100%, 100%, 0, 49.8%), respectively. While these three distinct colors have different hexadecimal, RGB, and CMYK color codes, in some use cases, it would be sufficient for a user to describe all three colors as "blue" without any further distinction.

The technical solutions described herein provide a method for users to work with intuitive human readable color names when searching for color codes from a list of color codes to match a specific color name. Using a mapping of ranges of color codes to specific color names, intuitive human readable color names can be provided.

A method is provided that retrieves color code names for a color code without needing to define the specific color code using various thresholds. A color code is received. If necessary, the color code is converted into HSL (hue, saturation, luminance) format. Each component of HSL—hue, saturation, and luminance—is then considered. First, luminance is identified to determine whether the color is black or white. Luminance is also commonly known as lightness. Next, saturation is identified to determine whether the color is gray. Finally, hue is identified to match non-monochromatic colors.

Advantages of this approach include flexibility with respect to defining colors. In particular, individual color codes need not be defined. Rather, only thresholds are defined. Additionally, the entire visible color spectrum can be covered using this approach because thresholds are defined for corresponding colors. Moreover, the amount of memory required for storage of the color information depends only on the number of human readable color names rather than the number of color samples.

Additionally, because every human perceives colors slightly differently, threshold values can be adjusted as needed. For example, training sets with human input can be used to adapt and fine-tune threshold values corresponding to color names. Alternatively, machine learning algorithms can be used to calculate corresponding threshold values.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 shows a table with exemplary luminance thresholds.

FIG. 4 shows a table with exemplary saturation thresholds.

FIG. 5 shows a table with exemplary hue thresholds.

The patent or application file contains at least one drawing executed in color. Copies of this patent or patent application publication with color drawing(s) will be provided by the Office upon request and payment of the necessary fee.

DETAILED DESCRIPTION

In general, this document describes mechanisms for determining color names or labels from a color code. Color codes are used to identify colors used in electronic documents. Various types of color codes exist, including hexadecimal, RGB, and CMYK. The hexadecimal color code uses three byte hexadecimal numbers that consist of six digits. Each of the three pairs of characters in the hex code represents the intensity of red, green, or blue, respectively. RGB is an additive color model in which the red, green, and blue are added together to reproduce colors. CMYK is a subtractive color model that refers to the four ink plates used in color printing—cyan, magenta, yellow, and key (i.e., black). For example, the color solid red is represented as a hexadecimal color code as #FF0000, as an RGB color code as (255, 0, 0), and as a CMYK color code as (0, 100%, 100%, 0). While each of these color codes can be used to precisely reference a particular color, they are generally meaningless to the average person. Instead, most humans would instead benefit from a more human readable color name, such as red, blue, or purple. Using the techniques described herein, descriptive color names or labels can be ascertained when only a color code is known.

Human readable color names are determined from a provided color code of a color. If the color code is not in HSL (hue, saturation, luminance) format, the color code is first converted into HSL format. Next, an algorithm is used that considers each component—hue, saturation, and luminance—to efficiently match the color code information with a human readable color name. In the first step, the luminance of the HSL color code is identified and compared to two thresholds to determine whether the color is either black or white. If, based on the luminance, the color is determined not to be either black or white, in the second step, the saturation of the HSL is identified and compared to a threshold to determine whether the color is gray. If, based on the saturation, the color is determined not to be gray, in the third step, the hue of the HSL is identified. The hue may be identified based on one or more predefined color ranges.

Figure 1:
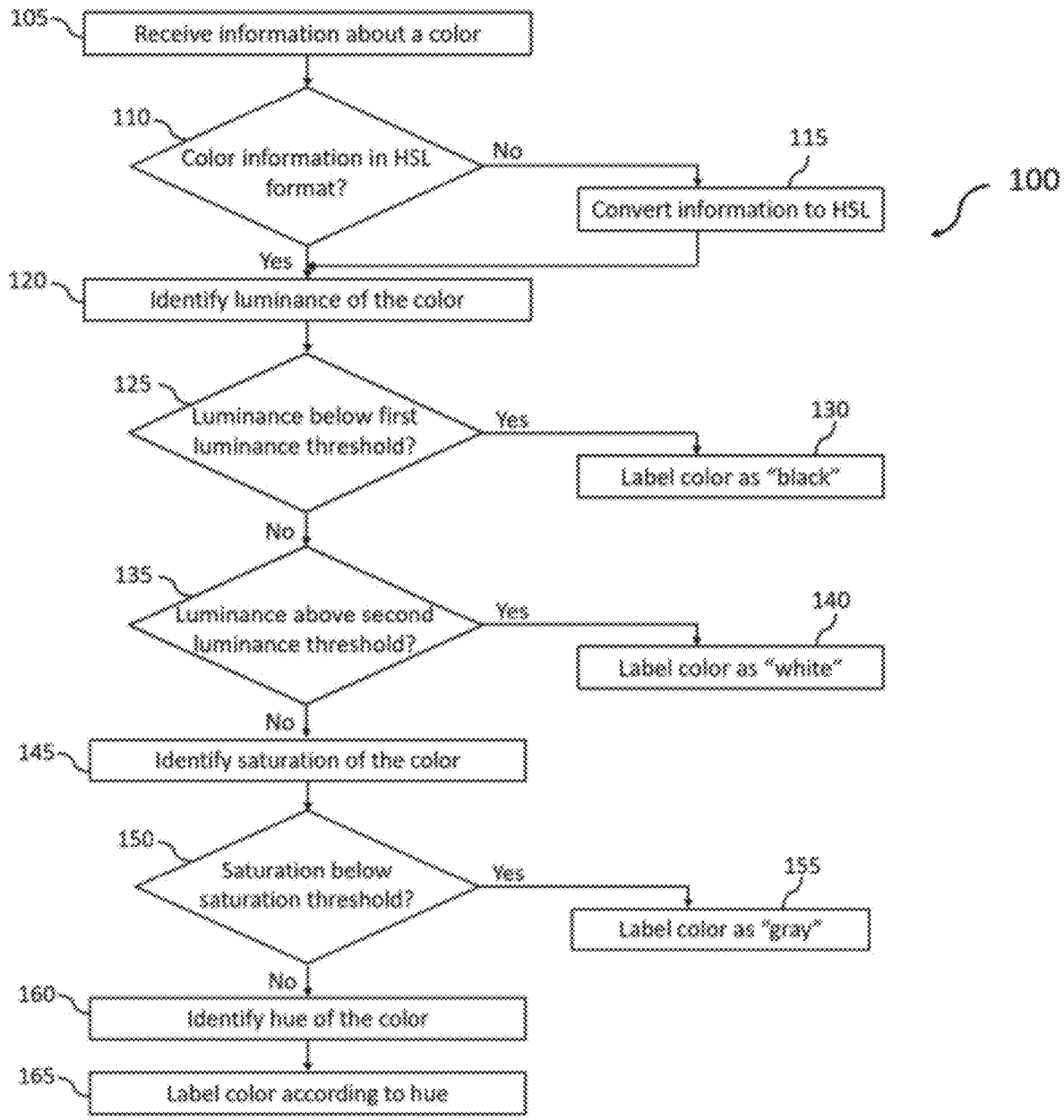
FIG. 1 is a flow chart of a method for intelligent color name matching using color code information.

FIG. 1 is a flow chart of a method 100 for intelligent color name matching using color code information. It will be understood that method 100 may be performed, for example, by any other suitable system, environment, software, and hardware, or a combination of systems, environments, software, and hardware as appropriate.

At 105, information about a color is received. The information about the color may be received in various forms, such as color codes. Color codes may be received in various formats, including hexadecimal, RGB, RGB percent, CMYK, CMY, HSV, HSL, CIELab, XYZ, AYB, CIELCh, Yxy, Android, and YUV. While these color codes are suitable for precisely describing a color, the codes are not intuitively human readable to a user. For example, multiple color codes may correspond, generally, to the color label "red." In hexadecimal format, for example, the color codes #FF0000, #DC1428, and #BD0D1f each correspond to a distinct color. However, each of the colors represented by the three hexadecimal codes corresponds to a different shade of red, though it is not immediately clear to a user from the color codes alone that these color codes are all in the family of red colors. Moreover, while each of the colors represented by the hexadecimal color codes #FF0000, #DC1428, and #BD0D1f, respectively, represents different shades of red, in some cases, it would be sufficient to a user to describe all three colors as "red" without any further distinction.

At 110, a determination is made regarding whether the received color information is in a format that indicates the hue, saturation, and luminance (e.g., HSL). As noted above, various formats of color information are possible, including hexadecimal, RGB, RGB percent, CMYK, CMY, HSV, HSL, CIELab, XYZ, AYB, CIELCh, Yxy, Android, and YUV color codes.

At 115, if the received color information is not in a format that indicates the hue, saturation, and luminance (e.g., HSL), the received color information is converted to an HSL format. Various methods for converting between color code formats are known in the art and may be used. For example, RGB color codes can be converted to HSL codes using the following known conversion formula:

$$R' = R/255$$

$$G' = G/255$$

-continued $$B' = B/255$$

$$C_{max} = \max(R', G', B')$$

$$C_{min} = \min(R', G', B')$$

$$\Delta = C_{max} - C_{min}$$

$$\text{Hue: } H = \begin{cases} 0°, \Delta = 0 \\ 60° \times \left(\dfrac{G' - B'}{\Delta} \bmod 6\right), & C_{max} = R' \\ 60° \times \left(\dfrac{B' - R'}{\Delta} + 2\right), & C_{max} = G' \\ 60° \times \left(\dfrac{R' - G'}{\Delta} + 4\right), & C_{max} = B' \end{cases}$$

$$\text{Saturation: } S = \begin{cases} 0, \Delta = 0 \\ \dfrac{\Delta}{1 - |2L - 1|}, \Delta <> 0 \end{cases}$$

$$\text{Luminance/Lightness: } L = \dfrac{C_{max} - C_{min}}{2}$$

Various other methods of converting between color codes are well known in the art.

At 120, a luminance L of the color is identified. With the color code information in HSL format, the luminance value is the L value of the color code. For the color red, for example, the hexadecimal color code is #FF0000, the RGB color code is (255, 0, 0), and the HSL color code is (0°, 100%, 50%). The luminance value L is the third value in the HSL color code. For example, for the pure red color with an HSL color code (0°, 100%, 50%), the L value is 50%.

At 125, a determination is made regarding whether the luminance L is below a first luminance threshold. For example, the identified luminance L is compared to the first luminance threshold. In general, if the luminance value is very low, the color will appear to be black to the human eye. In those cases, hue and saturation become irrelevant to the human eye. Thus, in this step, if the value of L is below a certain threshold, the color appears so dark that it can be considered as "black" to the human eye. At 130, if the luminance is determined to be below the first luminance threshold, then the color is labeled as black.

At 135, if the luminance is not determined to be below the first luminance threshold, a determination is made regarding whether the luminance is above a second luminance threshold. For example, the identified luminance L is compared to the second luminance threshold. In general, if the luminance value is very high, the color will appear to be white to the human eye. In those cases, hue and saturation because irrelevant to the human eye. Thus, in this step, if the value of L is above a certain threshold, the color appears so bright that it can be considered as "white" to the human eye. At 140, if the luminance is determined to be above the second luminance threshold, the color is labeled as white.

While steps 125 and 130 are shown in FIG. 1 as preceding steps 135 and 140, steps 135 and 140 can occur prior to steps 125 and 130.

Figure 2:
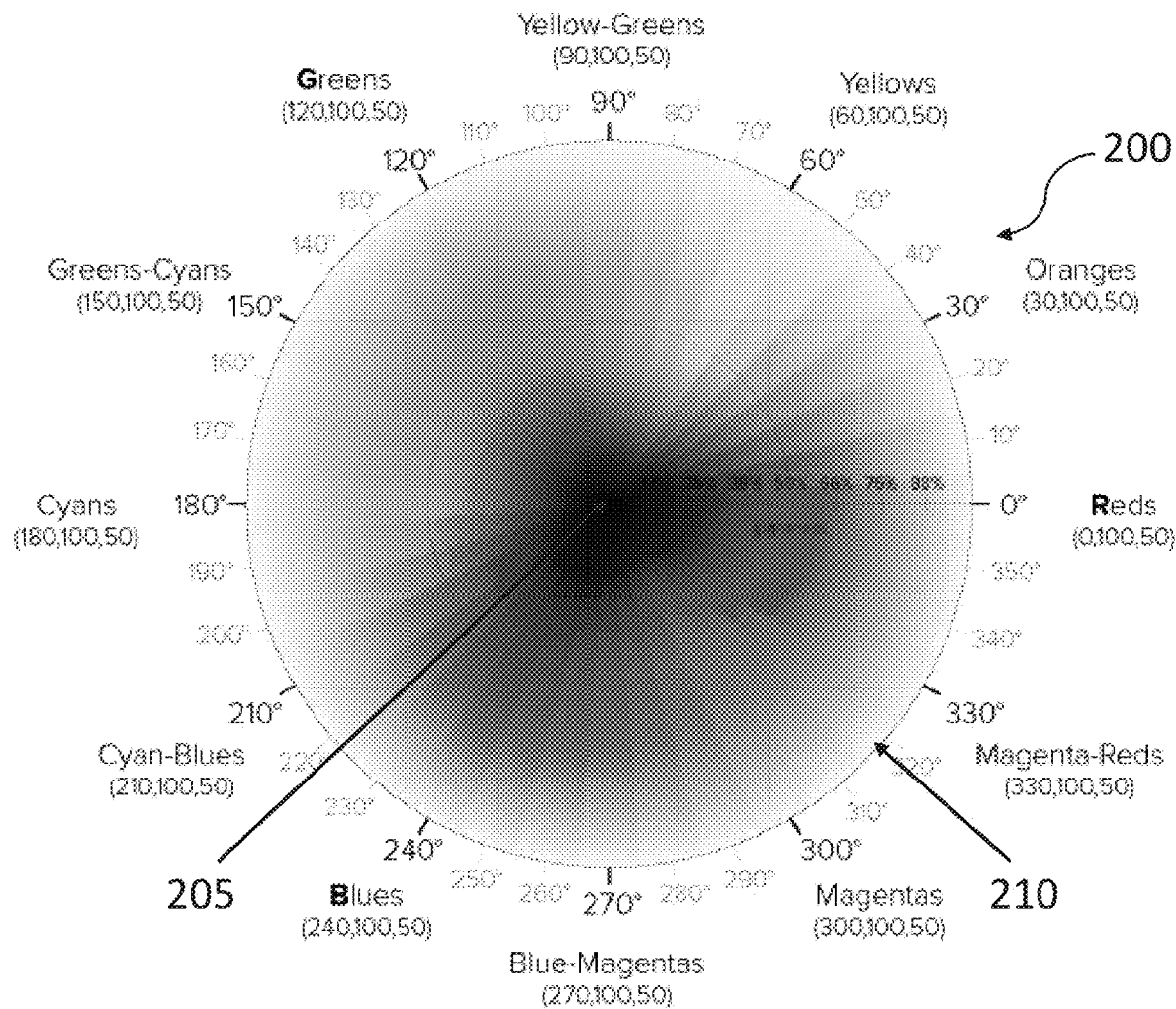
FIG. 2 is an exemplary hue-saturation-luminance color wheel.

FIG. 2 shows an exemplary hue-saturation-luminance color wheel. Colors appearing near the middle of the color wheel 205 have luminance values at or near 0%. While not precisely black, these colors appear close enough to black to the human eye that they can be understood and labeled as "black." On the other hand, colors appearing near the perimeter of the color wheel, such as at 210, for example, have luminance values at or near 100%. While not precisely white, these colors appear close enough to white to the human eye that they can be understood and labeled as "white."

The threshold values for the first and second luminance thresholds can be predetermined. FIG. 3 shows a table with example first and second luminance thresholds. For example, in this table, the first luminance threshold is 12%, so if a luminance L is below 12%, then the color is labeled as "black." In this table, the second luminance threshold is 93%, so if a luminance L is above 93%, then the color is labeled as "white." These threshold values are exemplary, however, and may be adjusted based on user feedback, machine learning, and the like.

At 145, if the luminance is not determined as below the first luminance threshold or above the second luminance threshold, a saturation S of the color is identified. These luminance values between the first luminance threshold and the second luminance value would appear, for example, somewhere between the middle of the color wheel 205 and near the perimeter of the color wheel 210 in FIG. 2. The saturation value S is the second value in the HSL color code. For example, for the pure red color with an HSL color code (0°, 100%, 50%), the S value is 100%.

At 150, a determination is made regarding whether the saturation is below a saturation threshold. For example, the identified saturation S is compared to the saturation threshold. In general, if the saturation value is very low, the color will appear to be gray to the human eye. In those cases, hue becomes irrelevant to the human eye. Thus, in this step, if the value of S is below a certain threshold, the color can be perceived as "gray" to the human eye. Thus, at 155, if the saturation is determined to be below the saturation threshold, the color is labeled as gray.

The threshold value for the saturation threshold can be predetermined. FIG. 4 shows a table with an example saturation threshold. For example, in this table, the saturation threshold is 25%, so if a saturation S is below 25%, then the color is labeled as "gray." As with the first and second luminance thresholds, the saturation threshold value is exemplary, however, and may be adjusted based on user feedback, machine learning, and the like.

At 160, if the saturation is not determined to be below the saturation threshold, a hue H of the color is identified. The hue value H is the first value in the HSL color code. For example, for the pure red color with an HSL color code (0°, 100%, 50%), the H value is 0°. At step 160, monochrome colors black, white, and gray have been filtered out by the earlier steps.

At 165, the color is labeled according to the hue. For example, the identified hue H is compared to a plurality of color ranges. Color ranges can be defined for each color label by using a minimum and maximum number. For example, if the hue H is between 180° and 255°, the color may be labeled as "blue." In another example, if the hue H is between 45° and 75°, the color may be labeled as "yellow."

The ranges corresponding to each color label can be predetermined. FIG. 5 shows a table with an example huge ranges for twelve different color labels. Using FIG. 5, for example, if a hue H is between 0° and 15° or between 345° and 360°, then the color is labeled as "red." Again using the hue ranges in FIG. 5, if a hue H is 15° or greater up and less than 45°, then the color is labeled as "orange." As with FIG. 3 and FIG. 4 and with the first and second luminance thresholds and the saturation threshold, the hue ranges in FIG. 5 are exemplary and may be adjusted based on user feedback, machine learning, and the like. As an example, the yellow-green color shown in FIG. 5 could be eliminated by expanding the thresholds of the neighboring hues yellow and green. In such an example, the range corresponding to yellow may become 45° to 90° and the range corresponding to green may also expand to become 90° to 135°. Thus, by changing thresholds or ranges, a particular implementation of this invention would have more color labels or fewer color labels to describe the color spectrum than are shown in FIG. 5.

The method 100 shown in FIG. 1 and described above provides a number of advantages. First, individual color codes need not be precisely defined. Instead, thresholds and ranges can be used to label colors. Second, using the method 100 of FIG. 1, the entire visible color spectrum can be covered by using hue, saturation, and luminance values. Third, the memory requirements of the method 100 of FIG. 1 depend only on the number of human readable color labels (e.g., twelve color labels shown in FIG. 5) rather than the total number of color samples.

Another advantage of this method is in the reduced processing required to label some colors. For example, if an input color is determined to be black at step 120, no further processing of the HSL data is needed as the method shown in FIG. 1 ends. This is in contrast to using RGB. For example, in RGB, black is coded as (0, 0, 0) while blue is coded as (0, 0, 255). In order to distinguish between black and blue, all three numbers in the RGB code must be analyzed. Analyzing only one out of the three values of an RGB code would yield incorrect and inconsistent results. Thus, more processing is needed in order to analyze RGB and other color codes.

Figure 6A:
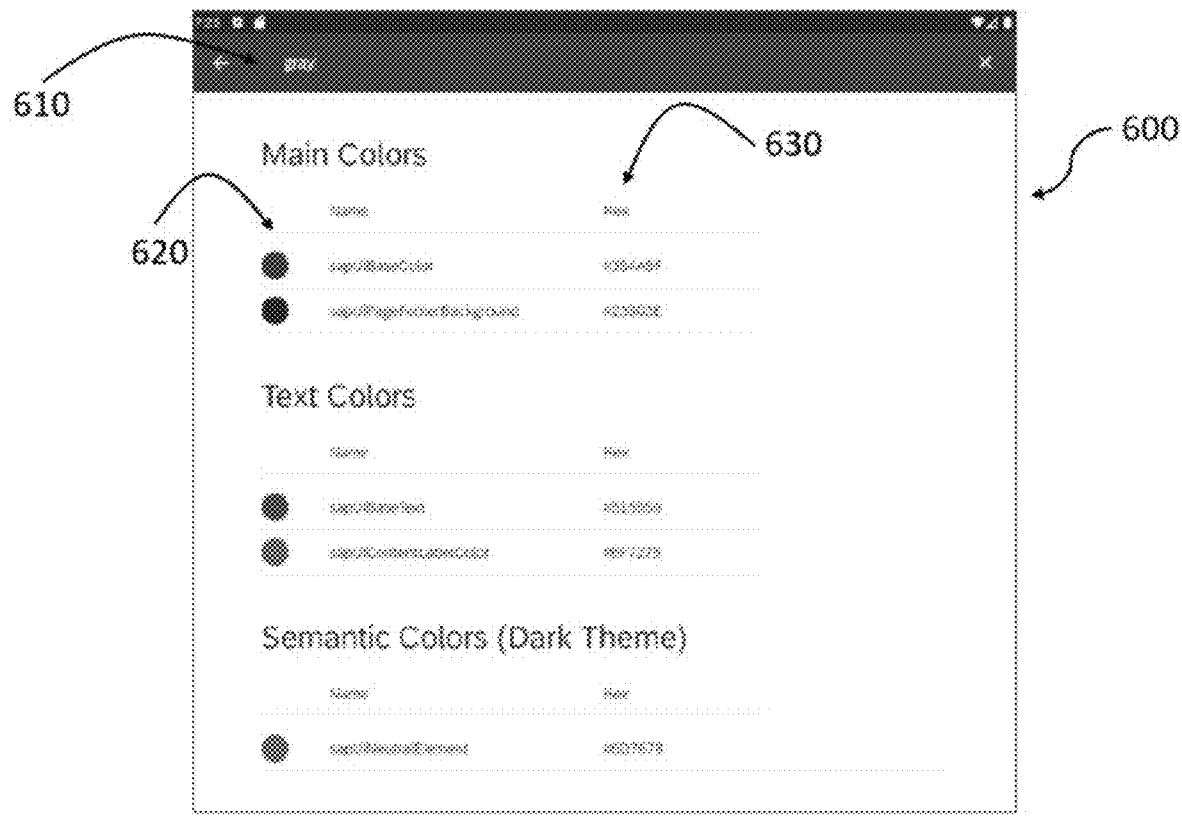
FIGS. 6A and 6B show example user interfaces for providing color samples that match a user query.
Figure 6B:
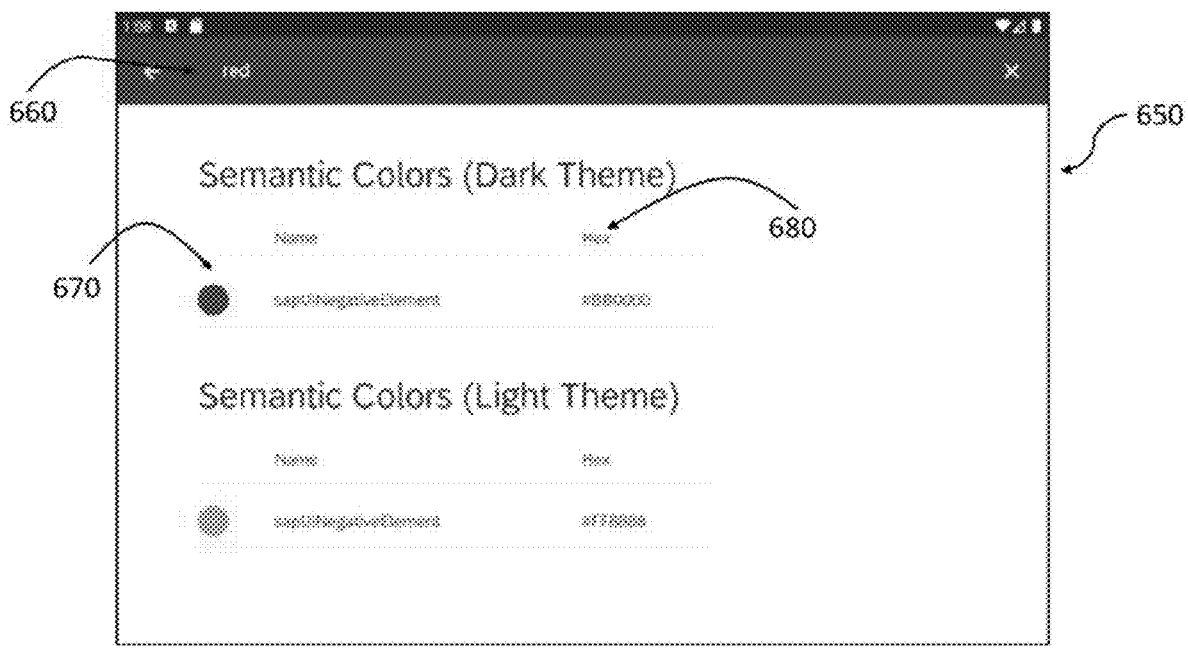

In some implementations, a plurality of color samples are stored, where each of the stored color samples is associated with one of the human readable color labels. In these implementations, it is possible for a user to search for a color samples using a generic color label. FIG. 6A shows an example user interface 600 where a user has searched for color samples matching the color label "gray" 610. The results are displayed for the user with the color shown in a first column 620, and the hexadecimal color codes are shown in a second column 630. FIG. 6B shows a second example user interface 650 where a user has searched for color samples matching the color label "red" 660. The results are displayed for the user with the color shown in a first column 670, and the hexadecimal color codes are shown in a second column 680.

As discussed above, the threshold values and ranges used in the methods described herein may be adjusted. Every human perceives colors slightly differently because color perception is subjective. As such, threshold values may also differ for different humans. Training sets that use human input may be used to adapt and fine-tune thresholds and color ranges.

One solution to address human subjectivity in perceiving color is using training sets with color samples. For example, a plurality of color samples may be shown to a plurality of users who are provided with a list of human readable color labels (e.g., red, orange, yellow, green, etc.). The plurality of users are then asked to provide an input for each of the color samples with a corresponding human readable color label that the particular user believes best matches the particular color sample. The color samples and inputs from the plurality of users are fed into machine learning algorithms as training sets. The machine learning algorithms calculate corresponding thresholds and ranges for HSL values. In some implementations, the plurality of users may be provided with a plurality of color samples but no list of human readable color labels. In these implementations, the users may be asked to provide an appropriate human readable color label without being provided color labels in advance. In these implementations, the names of the non-chromatic colors (i.e., non-black, non-white, and non-gray colors) could be derived from the user inputs during the training process.

Another solution to address human subjectivity is intelligently adapting the thresholds and ranges during usage of the method 100 of FIG. 1. The method 100 of FIG. 1 may be implemented in software. The software would offer a mechanism for users to provide feedback if users disagree with color labels provided in the software. As the software is used, the threshold and range values may be modified based on user feedback. For example, the software may start with predetermined thresholds and ranges for HSL values. If a user disagrees with the human readable color label provided by the software for a particular color, the user can provide feedback to the software. In some implementation, the user feed comprises an indication that the user disagrees with the human readable color label provided by the software for the particular color. In some implementations, the user feedback includes a color label that the user believes to be correct. In some implementations, the user may be limited to human readable color labels that are provided by the software. In other implementations, the user may be permitted to provide color labels that were not previously included in the software. Based on the input from the user, the threshold values and ranges for the HSL values are adjusted.

In some implementations, the training sets and machine learning algorithms described above may be used alone or in combination with the intelligent adapting of thresholds and ranges described above.

Figure 7:
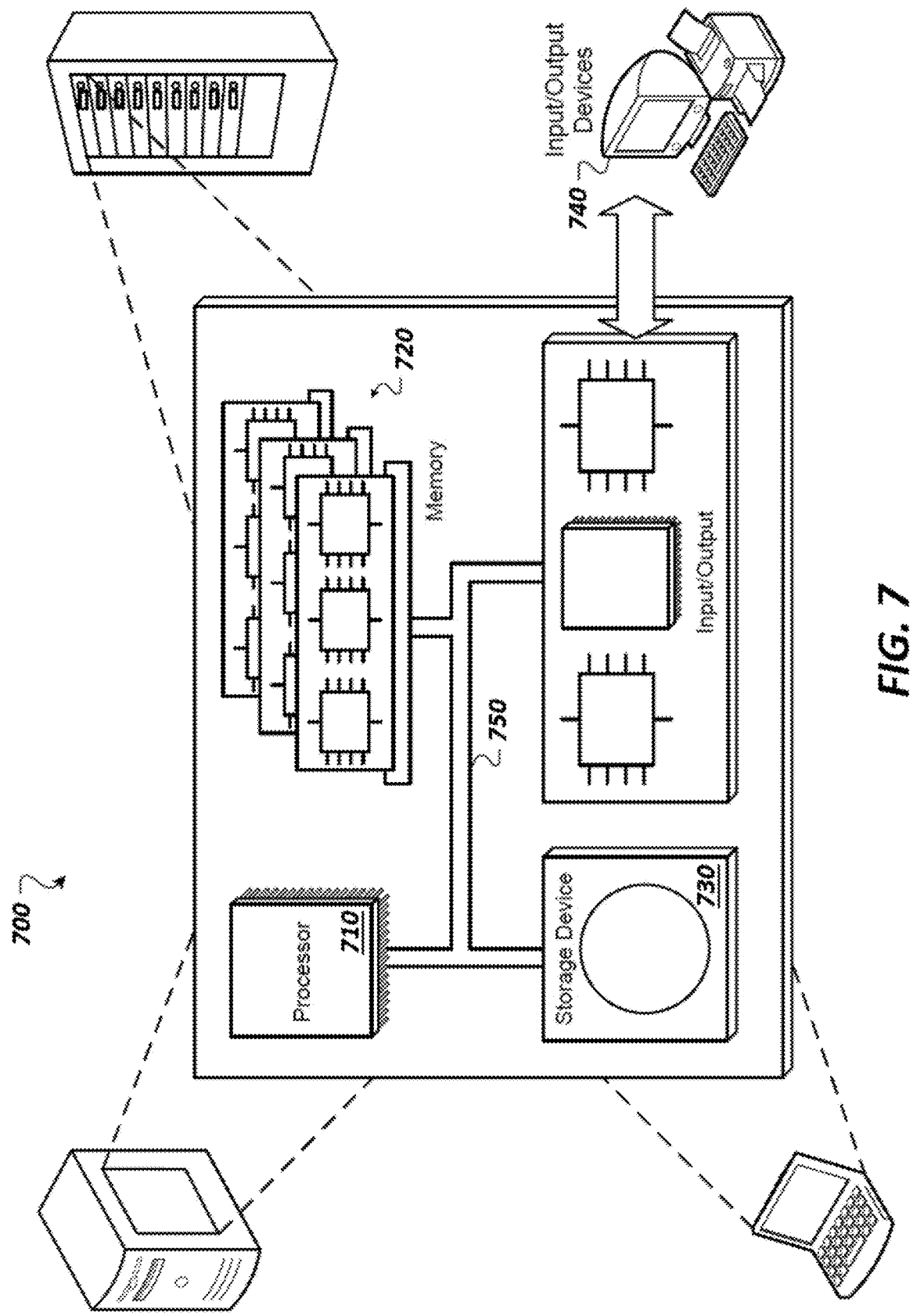
FIG. 7 is a schematic illustration of example computer systems that can be used to execute implementations of the present disclosure.

FIG. 7 is a schematic illustration of example computer systems 700 that can be used to execute implementations of the present disclosure. The system 700 can be used for the operations described in association with the implementations described herein. For example, the system 700 may be included in any or all of the server components discussed herein. The system 700 includes a processor 710, a memory 720, a storage device 730, and an input/output device 740. Each of the components 710, 720, 730, 740 are interconnected using a system bus 745. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computerized method performed by one or more processors, the method comprising:
    providing a plurality of color samples to a plurality of users;
    receiving, from each of the plurality of users, inputs for each of the color samples, wherein the inputs comprise color names that match the color samples;
    using a machine learning algorithm to calculate a first luminance threshold, second luminance threshold, saturation threshold, and a plurality of hue thresholds based on the received inputs;
    receiving information about a color;
    identifying luminance of the color;
    in response to determining that the luminance of the color is below the first luminance threshold, labeling the color as black;
    in response to determining that the luminance of the color is above the second luminance threshold, labeling the color as white;
    in response to determining that the luminance is between the first luminance threshold and the second luminance threshold, identifying saturation of the color;
    in response to determining that the saturation of the color is below the saturation threshold, labeling the color as gray;
    in response to determining that the saturation is above the saturation threshold, identifying hue of the color; and
    in response to identifying the hue of the color, labeling the color according to the hue using the plurality of hue thresholds.

2. The method of claim 1, wherein labeling the color according to the identified hue comprises using a color table comprising a plurality of color labels, wherein the plurality of hue thresholds define each color label in the plurality of color labels.

3. The method of claim 2, wherein each of the first luminance threshold, second luminance threshold, saturation threshold, and the plurality of hue thresholds is user adjustable.

4. The method of claim 1, wherein labeling the color according to the identified hue comprising labeling the color as blue if the identified hue is between 180 and 255.

5. The method of claim 1, wherein labeling the color according to the identified hue comprising labeling the color as yellow if the identified hue is between 45 and 75.

6. The method of claim 1, further comprising:
    receiving feedback from a user with respect to the labeled color.

7. The method of claim 6, further comprising:
    determining that the received feedback includes an indication that the labeled color is incorrectly labeled; and adjusting the value of one or more of the first luminance threshold, second luminance threshold, saturation threshold, and the plurality of hue thresholds based on the received feedback.

8. The method of claim 6, wherein the received feedback from the user includes an indication of a user-determined color label, the method further comprising:
adjusting the value of one or more of the first luminance threshold, second luminance threshold, saturation threshold, and plurality of hue thresholds based on the received feedback.

9. The method of claim 2, wherein the first luminance threshold, second luminance threshold, saturation threshold, and the plurality of hue thresholds are calculated using two or more machine learning algorithms.

10. The method of claim 1, wherein the plurality of color labels are derived from the received inputs.

11. The method of claim 1, further comprising:
converting the information about the color into a hue, saturation, and luminance format.

12. The method of claim 1, wherein the information about the color comprises a color code.

13. The method of claim 1, wherein in response to labeling the color, ending the method.

14. A non-transitory, computer-readable medium storing computer-readable instructions executable by a computer and configured to instruct the computer to:
provide a plurality of color samples to a plurality of users;
receive, from each of the plurality of users, inputs for each of the color samples, wherein the inputs comprise color names that match the color samples;
use a machine learning algorithm to calculate a first luminance threshold, second luminance threshold, saturation threshold, and a plurality of hue thresholds based on the received inputs;
receive information about a color;
identify luminance of the color;
in response to determining that the luminance of the color is below the first luminance threshold, label the color as black;
in response to determining that the luminance of the color is above the second luminance threshold, label the color as white;
in response to determining that the luminance is between the first luminance threshold and the second luminance threshold, identify saturation of the color;
in response to determining that the saturation of the color is below the saturation threshold, label the color as gray;
in response to determining that the saturation is above the saturation threshold, identify hue of the color; and
in response to identifying the hue of the color, label the color according to the hue using the plurality of hue thresholds.

15. The non-transitory, computer-readable medium of claim 14, wherein the instructions are further configured to instruct the computer to:
label the color according to the identified hue comprises using a color table comprising a plurality of color labels, wherein the plurality of hue thresholds define each color label in the plurality of color labels.

16. The non-transitory, computer-readable medium of claim 14, wherein each of the first luminance threshold, second luminance threshold, saturation threshold, and the plurality of hue thresholds is user adjustable.

17. The non-transitory, computer-readable medium of claim 14, wherein the first luminance threshold, second luminance threshold, saturation threshold, and the plurality of hue thresholds are calculated using one or more machine learning algorithms.

18. The non-transitory, computer-readable medium of claim 14, wherein the instructions are further configured to instruct the computer to:
convert the information about the color into a hue, saturation, and luminance format.

19. A computerized method performed by one or more processors, the method comprising:
providing a plurality of color samples to a plurality of users;
receiving, from each of the plurality of users, inputs for each of the color samples, wherein the inputs comprise color names that match the color samples;
using a machine learning algorithm to calculate a first luminance threshold, second luminance threshold, saturation threshold, and a plurality of hue thresholds based on the received inputs;
associating each hue threshold of the plurality of hue thresholds with a color label in a color table comprising a plurality of color labels;
receiving information about a color;
identifying luminance, saturation, and hue of the color;
prior to analyzing the saturation or the hue of the color, analyzing the luminance of the color, comprising:
comparing the luminance of the color to the first luminance threshold and the second luminance threshold;
if the luminance of the color is below the first luminance threshold, labeling the color as black; and
if the luminance of the color is above the second threshold, labeling the color as white;
in response to determining that the luminance of the color is above the first luminance threshold and below the second luminance threshold and prior to analyzing the hue of the color, performing an analysis of the saturation of the color, comprising:
comparing the saturation of the color to the saturation threshold; and
if the saturation of the color is below the saturation threshold, labeling the color as gray;
in response to determining that the saturation of the color is above the saturation threshold, analyzing the hue of the color, comprising:
comparing the hue of the color to a plurality of hue thresholds and a corresponding plurality of color labels; and
labeling the color with a particular color label according to the plurality of hue thresholds and corresponding plurality of color labels.

\* \* \* \* \*